US012785379B2

(12) United States Patent
Zeng et al.

(10) Patent No.: US 12,785,379 B2
(45) Date of Patent: Nov. 3, 2026

(54) RELAY PROTECTION CIRCUIT FOR BMS

(71) Applicant: Shenzhen Mingtang New Energy Technology Co., Ltd., Shenzhen (CN)

(72) Inventors: Wujun Zeng, Shenzhen (CN); Yingjun Diao, Shenzhen (CN); Jiabin Fu, Shenzhen (CN); Mingxiang Luo, Shenzhen (CN); Zhiru Li, Shenzhen (CN)

(73) Assignee: Shenzhen Mingtang New Energy Technology Co., Ltd., Shenzhen (CN)

( * ) Notice: Subject to any disclaimer, the term of this patent is extended or adjusted under 35 U.S.C. 154(b) by 103 days.

(21) Appl. No.: 19/075,750

(22) Filed: Mar. 10, 2025

(65) Prior Publication Data

US 2025/0323488 A1 Oct. 16, 2025

(30) Foreign Application Priority Data

Apr. 16, 2024 (CN) ......................... 202420812784.7

(51) Int. Cl.
*H02H 3/08* (2006.01)
*H02H 1/00* (2006.01)

(52) U.S. Cl.
CPC ............ *H02H 3/08* (2013.01); *H02H 1/0007* (2013.01)

(58) Field of Classification Search
None
See application file for complete search history.

(56) References Cited

U.S. PATENT DOCUMENTS

2015/0072209 A1* 3/2015 Tyler ....................... B60L 50/16
429/159

FOREIGN PATENT DOCUMENTS

CN 205905816 U 1/2017

* cited by examiner

*Primary Examiner* — Crystal L Hammond
(74) *Attorney, Agent, or Firm* — FIDELI LAW PLLC; Qiang Li

(57) ABSTRACT

The invention discloses a relay protection circuit for a BMS. The relay protection circuit for a BMS includes: a BMS battery, a shunt resistor, a current detection module, an AFE chip, an MCU control chip, a pre-discharging MOS module, a pre-charging MOS module, a relay and a relay control power supply. The current detection module is configured to detect a current of the shunt resistor to generate a current detection signal, and the current detection signal is transmitted to the AFE chip to determine whether the detected current exceeds a current threshold; and when the detected current exceeds the current threshold, the AFE chip sends a notification signal to the MCU control chip, and the MCU control chip controls an on/off state of the relay control power supply so as to control an on/off state of the relay.

10 Claims, 2 Drawing Sheets

RELAY PROTECTION CIRCUIT FOR BMS

RELATED APPLICATIONS

The present patent document claims the benefit of priority to Patent Application No. 202420812784.7, filed Apr. 16, 2024, and entitled "RELAY PROTECTION CIRCUIT FOR BMS," the entire contents of each of which are incorporated herein by reference.

BACKGROUND

1. Technical Field

The invention relates to the field of relay protection, and in particular to a relay protection circuit for a BMS.

2. Background Information

The current battery management system (BMS) adopts a complicated relay scheme, which includes four key relays: a pre-charging relay, a pre-discharging relay, a main charging relay and a main discharging relay. These relays play an important role in the battery charging and discharging process, helping to manage the flow of current and protecting the battery from over-charging and over-discharging.

However, although this relay scheme is very effective in function, it also introduces a series of problems. The existing scheme increases the complexity of battery assembly. Each relay needs to be accurately mounted and mated with other components, which requires more manual operations and more time for debugging and testing. This not only increases the workload of the production line, but also increases the possibility of errors in the manufacturing process. The existing scheme significantly increases the manufacturing cost. In addition to the cost of the relays, it is also necessary to consider the increased labor cost, additional equipment and tool investment and cost of space occupied by the relays. The relay scheme also increases the defective rate, and since there are more components and connections involved, the possibility of errors in the manufacturing process also increases accordingly. This may lead to failures or quality problems of some batteries in the production process, requiring additional repair or recovery, thus increasing unnecessary cost and time cost. Therefore, in order to solve the technical problems of high manufacturing cost and high assembly defective rate of the current multi-relay technology, a new technology is needed to solve the current problems.

BRIEF SUMMARY

A main objective of the invention is to solve the technical problems of high manufacturing cost and high assembly defective rate of the current multi-relay technology.

A first aspect of the invention provides a relay protection circuit for a BMS. The relay protection circuit for a BMS includes: a BMS battery, a shunt resistor, a current detection module, an AFE chip, an MCU control chip, a pre-discharging MOS module, a pre-charging MOS module, a relay and a relay control power supply. A positive terminal of the BMS battery is connected to a negative terminal of an external load, a negative terminal of the BMS battery is connected to one end of the shunt resistor, the other end of the shunt resistor is connected to the pre-discharging MOS module and the relay, the relay is connected to a positive terminal of the external load, the relay control power supply is connected in parallel with the relay, the pre-discharging MOS module is connected in series with the pre-charging MOS module, the pre-discharging MOS module and the pre-charging MOS module are connected in parallel with the relay, the shunt resistor is connected in parallel with the current detection module, the current detection module is connected to the AFE chip, the AFE chip is connected to the MCU control chip, and the MCU control chip is connected to the relay control power supply.

The current detection module is configured to detect a current of the shunt resistor to generate a current detection signal, and the current detection signal is transmitted to the AFE chip to determine whether the detected current exceeds a current threshold; and when the detected current exceeds the current threshold, the AFE chip sends a notification signal to the MCU control chip, and the MCU control chip controls an on/off state of the relay control power supply based on the notification signal so as to control an on/off state of the relay.

Optionally, in a first implementation of the first aspect of the invention, the relay protection circuit for a BMS further includes: a resettable fuse, and one end of the resettable fuse is connected in series with the pre-charging MOS module.

Optionally, in a second implementation of the first aspect of the invention, the relay protection circuit for a BMS further includes: a pre-charging/pre-discharging current-limiting resistor, and one end of the pre-charging/pre-discharging current-limiting resistor is connected in series with the other end of the resettable fuse.

Optionally, in a third implementation of the first aspect of the invention, the relay protection circuit for a BMS further includes: a pre-discharging unidirectional current-limiting resistor, and one end of the pre-discharging unidirectional current-limiting resistor is connected in series with the other end of the pre-charging/pre-discharging current-limiting resistor.

Optionally, in a fourth implementation of the first aspect of the invention, the other end of the pre-discharging unidirectional current-limiting resistor is connected to the positive terminal of the external load.

Optionally, in a fifth implementation of the first aspect of the invention, the pre-discharging MOS module includes: a first MOS transistor and a first diode, a source of the first MOS transistor is connected to a cathode of the first diode, a drain of the first MOS transistor is connected to an anode of the first diode, and the drain of the first MOS transistor and the anode of the first diode are connected to the pre-charging MOS module.

Optionally, in a sixth implementation of the first aspect of the invention, the pre-charging MOS module includes: a second MOS transistor and a second diode, a source of the second MOS transistor is connected to a cathode of the second diode, a drain of the second MOS transistor is connected to an anode of the second diode, and the drain of the first MOS transistor is connected to the drain of the second MOS transistor.

Optionally, in a seventh implementation of the first aspect of the invention, the pre-discharging MOS module further includes: a first capacitor, and the first capacitor is connected in parallel with the first MOS transistor.

Optionally, in an eighth implementation of the first aspect of the invention, the pre-charging MOS module includes: a second capacitor, and the second capacitor is connected in parallel with the second MOS transistor.

Optionally, in a ninth implementation of the first aspect of the invention, the relay control power supply includes: a 12 V direct current power supply.

In the embodiments of the invention, by modifying the circuit, one relay is used instead of multiple relays, which reduces the manufacturing cost, facilitates the production and assembly process, reduces the standby current and ensures the stability and durability of the product, thereby solving the technical problems of high manufacturing cost and high assembly defective rate of the current multi-relay technology.

DETAILED DESCRIPTION OF THE DRAWINGS AND THE PRESENTLY PREFERRED EMBODIMENTS

Embodiments of the invention provide a relay protection circuit for a BMS.

The embodiments disclosed in the invention will be described in more detail below with reference to the accompanying drawings. Although some embodiments of the invention are shown in the accompanying drawings, it should be understood that the invention can be implemented in various forms and should not be construed as being limited to the embodiments set forth herein. Rather, these embodiments are provided for a more thorough and complete understanding of the disclosure. It should be understood that the accompanying drawings and embodiments disclosed in the invention are merely used for illustrative purposes, and are not intended to limit the scope of protection disclosed in the invention.

In the description of the embodiments disclosed in the invention, the term "including" and similar terms should be understood as open-ended inclusion, that is, "including but not limited to". The term "based on" should be understood as "at least partially based on". The terms "one embodiment" or "the embodiment" should be understood as "at least one embodiment". The terms "first", "second" and so on may refer to different or the same object. Other explicit and implicit definitions may also be included below.

Figure 1:
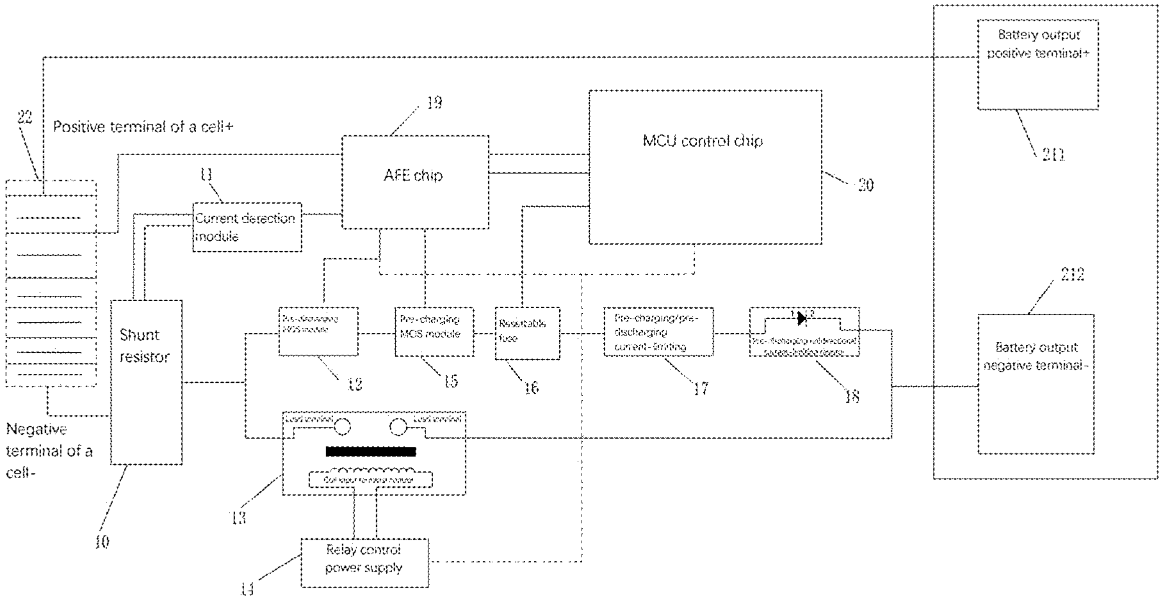
FIG. 1 is a schematic diagram of a first embodiment of a relay protection circuit for a BMS according to an embodiment of the invention.

For the convenience of understanding, the specific procedure of the embodiments of the invention is described below. FIG. 1 is an embodiment of a relay protection circuit for a BMS according to an embodiment of the invention. The relay protection circuit for a BMS includes: a BMS battery 22, a shunt resistor 10, a current detection module 11, an AFE chip 19, an MCU control chip 20, a pre-discharging MOS module 12, a pre-charging MOS module 15, a relay 13 and a relay control power supply 14. A positive terminal of the BMS battery 22 is connected to a negative terminal 211 of an external load, that is, a positive terminal of a cell serves as a battery output positive terminal 211. A negative terminal of the BMS battery 22 is connected to one end of the shunt resistor 10. The other end of the shunt resistor 10 is connected to the pre-discharging MOS module 12 and the relay 13. The relay 13 is connected to a positive terminal of the external load. The relay control power supply 14 is connected in parallel with the relay 10. The pre-discharging MOS module 12 is connected in series with the pre-charging MOS module 15. The pre-discharging MOS module 12 and the pre-charging MOS module 15 are connected in parallel with the relay 13. The shunt resistor 10 is connected in parallel with the current detection module 11. The current detection module 11 is connected to the AFE chip 19. The AFE chip 19 is connected to the MCU control chip 20. The MCU control chip 20 is connected to the relay control power supply 14.

The current detection module 11 is configured to detect a current of the shunt resistor 10 to generate a current detection signal, and the current detection signal is transmitted to the AFE chip 19 to determine whether the detected current exceeds a current threshold.

When the detected current exceeds the current threshold, the AFE chip 19 sends a notification signal to the MCU control chip 20, and the MCU control chip 20 controls an on/off state of the relay control power supply 14 based on the notification signal so as to control an on/off state of the relay 13.

Detailed description of the principle: The current detection module 11 is used for current collection. If a current flows through the shunt resistor 10, a voltage drop is generated across the shunt resistor. When a voltage drop is generated across the shunt resistor as a current flows through the shunt resistor 10, the voltage across the shunt resistor is detected to the current detection module 11 which transmits a signal to the AFE chip 19 so as to correspondingly control the pre-discharging MOS module 12, the pre-charging MOS module 15 and the relay control power supply 14. The AFE chip 19 controls the relay 13 to be on or off according to the actual current, and the MCU control chip 20 obtains the current at the AFE chip 19 to make the corresponding control output.

Further, the relay protection circuit for a BMS further includes: a resettable fuse 16, and one end of the resettable fuse 16 is connected in series with the pre-charging MOS module 15.

The relay protection circuit for a BMS further includes: a pre-charging/pre-discharging current-limiting resistor 17, and one end of the pre-charging/pre-discharging current-limiting resistor 17 is connected in series with the other end of the resettable fuse 16.

The relay protection circuit for a BMS further includes: a pre-discharging unidirectional current-limiting resistor 18, and one end of the pre-discharging unidirectional current-limiting resistor 18 is connected in series with the other end of the pre-charging/pre-discharging current-limiting resistor 17.

The other end of the pre-discharging unidirectional current-limiting resistor 18 is connected to the positive terminal 212 of the external load.

The resettable fuse 16 controls the current to be on or off. When the current is greater than a designed pre-discharging current, the resettable fuse 16 automatically breaks, and turns on the relay 13, the pre-charging/pre-discharging current-limiting resistor 17 and the pre-discharging unidirectional current-limiting resistor 18. When a charging current flows through the pre-charging/pre-discharging current-limiting resistor 17 and the pre-discharging unidirectional current-limiting resistor 18, they function to limit the current.

Figure 2:
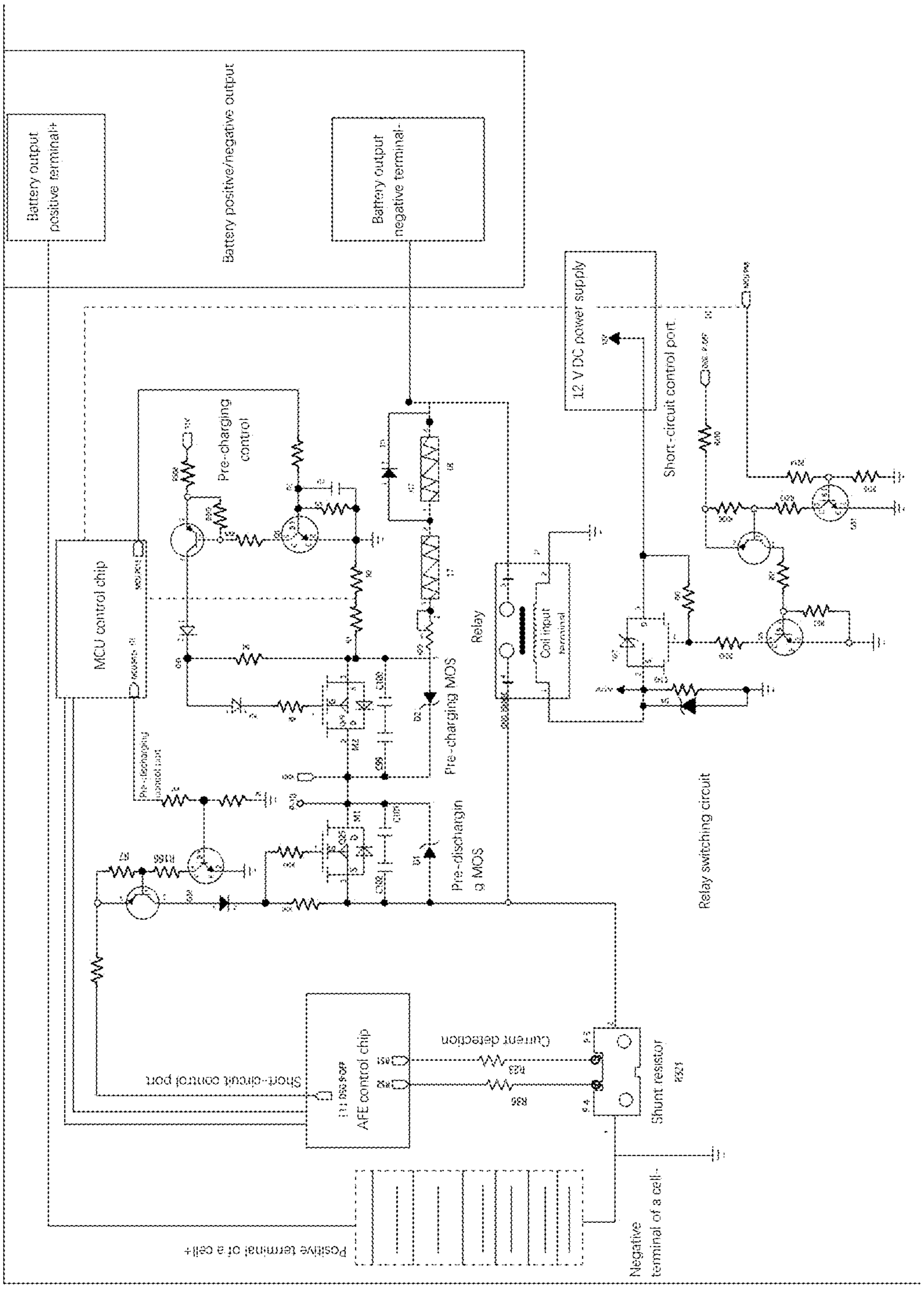
FIG. 2 is a schematic diagram of a second embodiment of a relay protection circuit for a BMS according to an embodiment of the invention.

Specifically, referring to FIG. 2, FIG. 2 is a schematic diagram of a specific embodiment according to an embodiment of the invention. The pre-discharging MOS module includes: a first MOS transistor M1 and a first diode D1. A source of the first MOS transistor M1 is connected to a cathode of the first diode D1, a drain of the first MOS transistor M1 is connected to an anode of the first diode D1, and the drain of the first MOS transistor M1 and the anode of the first diode D1 are connected to the pre-charging MOS module.

The pre-discharging MOS module further includes: a first capacitor (C102 or C101), and the first capacitor (C102 or C101) is connected in parallel with the first MOS transistor M1, and actually, is also connected in parallel with the first diode D1.

The pre-charging MOS module includes: a second MOS transistor M2 and a second diode D2. A source of the second MOS transistor M2 is connected to a cathode of the second diode D2, a drain of the second MOS transistor M2 is connected to an anode of the second diode D2, and the drain of the first MOS transistor M1 is connected to the drain of the second MOS transistor M2.

The pre-charging MOS module includes: a second capacitor (C99 or C100), and the second capacitor (C99 or C100) is connected in parallel with the second MOS transistor M2.

The relay control power supply 14 can be a 12 V direct current (DC) power supply.

Although there are parasitic diodes in the first MOS transistor M1 and the second MOS transistor M2 in FIG. 2, actually, the scheme of this application can be implemented by using MOS transistors without parasitic diodes.

Discharging control principle: When the load needs to be discharged, in normal cases, both the pre-charging MOS module 15 and the pre-discharging MOS transistor 15 are on, and the relay 13 is off. In this case, the standby current can be about 10 times smaller (if the standby current can be 100 mA or above when a pre-charging relay and a pre-discharging relay are used, the standby current of the scheme of this application is about 10 mA). Once the external load is connected, the current flows through the pre-discharging unidirectional current-limiting resistor 18, the pre-charging/pre-discharging current-limiting resistor 17, the resettable fuse 16, the pre-charging MOS module 15 and the pre-discharging MOS module 12, and there is a current in the shunt resistor 10. When the AFE chip 19 detects a current of greater than 1 A, it transmits a signal to notify the MCU control chip 20, which controls the relay control power supply 14 to turn on the relay 13. At this time, the relay 13 works normally, and the load works with a heavy current through the relay 13.

Charging control principle: In the case where the load needs to be connected to a charger for charging, in normal cases, both the pre-charging MOS module 15 and the pre-discharging MOS transistor 15 are on, and the relay 13 is off. When the load is connected to the charger for charging, the current of the charger flows from the positive terminal to the negative terminal of the cell, and then the current flows through the shunt resistor 10, the pre-discharging MOS module 12, the pre-charging MOS module 15, the resettable fuse 16, the pre-charging/pre-discharging current-limiting resistor 17 and a bypass diode of the pre-discharging unidirectional current-limiting resistor 18 to the output negative terminal of the battery. There is a current in the shunt resistor 10. If the AFE chip 19 detects a current greater than 500 mA, it notifies the MCU control chip 20, which controls the relay control power supply 14 to turn on the relay 13. At this time, the relay 13 works normally, and the load is charged with a heavy current through the relay 13.

In addition, although operations are depicted in a particular order, this should be understood as requiring that such operations should be performed in the particular order shown or in a sequential order, or that all of the illustrated operations should be performed to achieve a desired result. Multitasking and parallel processing may be advantageous in certain environments. Similarly, although several specific implementation details are contained in the above discussion, these should not be construed as limiting the scope of the disclosure. Some features described in the context of individual embodiments may also be implemented in combination in a single implementation. Conversely, the various features described in the context of a single implementation may also be implemented in a plurality of implementations individually or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely exemplary forms of implementing the claims.

The invention claimed is:

1. A relay protection circuit for a BMS, comprising a BMS battery, a shunt resistor, a current detection module, an AFE chip, an MCU control chip, a pre-discharging MOS module, a pre-charging MOS module, a relay and a relay control power supply, wherein a positive terminal of the BMS battery is connected to a negative terminal of an external load, a negative terminal of the BMS battery is connected to one end of the shunt resistor, the other end of the shunt resistor is connected to the pre-discharging MOS module and the relay, the relay is connected to a positive terminal of the external load, the relay control power supply is connected in parallel with the relay, the pre-discharging MOS module is connected in series with the pre-charging MOS module, the pre-discharging MOS module and the pre-charging MOS module are connected in parallel with the relay, the shunt resistor is connected in parallel with the current detection module, the current detection module is connected to the AFE chip, the AFE chip is connected to the MCU control chip, and the MCU control chip is connected to the relay control power supply;

wherein the current detection module is configured to detect a current of the shunt resistor to generate a current detection signal, and the current detection signal is transmitted to the AFE chip to determine whether the detected current exceeds a current threshold; and when the detected current exceeds the current threshold, the AFE chip sends a notification signal to the MCU control chip, and the MCU control chip controls an on/off state of the relay control power supply based on the notification signal so as to control an on/off state of the relay.

2. The relay protection circuit for a BMS according to claim 1, wherein the relay protection circuit for a BMS further comprises: a resettable fuse, and one end of the resettable fuse is connected in series with the pre-charging MOS module.

3. The relay protection circuit for a BMS according to claim 2, wherein the relay protection circuit for a BMS further comprises: a pre-charging/pre-discharging current-limiting resistor, and one end of the pre-charging/pre-discharging current-limiting resistor is connected in series with the other end of the resettable fuse.

4. The relay protection circuit for a BMS according to claim 3, wherein the relay protection circuit for a BMS further comprises: a pre-discharging unidirectional current-limiting resistor, and one end of the pre-discharging unidirectional current-limiting resistor is connected in series with the other end of the pre-charging/pre-discharging current-limiting resistor.

5. The relay protection circuit for a BMS according to claim 4, wherein the other end of the pre-discharging unidirectional current-limiting resistor is connected to the positive terminal of the external load.

6. The relay protection circuit for a BMS according to claim 1, wherein the pre-discharging MOS module comprises: a first MOS transistor and a first diode, a source of the first MOS transistor is connected to a cathode of the first diode, a drain of the first MOS transistor is connected to an anode of the first diode, and the drain of the first MOS transistor and the anode of the first diode are connected to the pre-charging MOS module.

7. The relay protection circuit for a BMS according to claim 6, wherein the pre-charging MOS module comprises: a second MOS transistor and a second diode, a source of the second MOS transistor is connected to a cathode of the second diode, a drain of the second MOS transistor is connected to an anode of the second diode, and the drain of the first MOS transistor is connected to the drain of the second MOS transistor.

8. The relay protection circuit for a BMS according to claim 7, wherein the pre-charging MOS module comprises: a second capacitor, and the second capacitor is connected in parallel with the second MOS transistor.

9. The relay protection circuit for a BMS according to claim 6, wherein the pre-discharging MOS module further comprises: a first capacitor, and the first capacitor is connected in parallel with the first MOS transistor.

10. The relay protection circuit for a BMS according to claim 1, wherein the relay control power supply comprises: a 12 V direct current power supply.

* * * * *